(12) United States Patent
Cho (10) Patent No.: US 12,248,309 B2
(45) Date of Patent: Mar. 11, 2025

(54) SYSTEM AND METHOD FOR DIAGNOSING STATE OF MECHANICAL EQUIPMENT

(71) Applicant: UDS, INC., Seongnam-si (KR)

(72) Inventor: Jung Kweon Cho, Hwaseong-si (KR)

(73) Assignee: UDS, INC., Seongnam-si (KR)

( * ) Notice: Subject to any disclaimer, the term of this patent is extended or adjusted under 35 U.S.C. 154(b) by 365 days.

(21) Appl. No.: 17/819,541

(22) Filed: Aug. 12, 2022

(65) Prior Publication Data

US 2023/0057521 A1    Feb. 23, 2023

(30) Foreign Application Priority Data

Aug. 20, 2021 (KR) .................. 10-2021-0110031

(51) Int. Cl.
  *G05B 23/02* (2006.01)
  *G05B 19/401* (2006.01)
(52) U.S. Cl.
  CPC ....... *G05B 23/0218* (2013.01); *G05B 19/401* (2013.01)
(58) Field of Classification Search
  CPC .................................................. G05B 23/0218
  See application file for complete search history.

(56) References Cited

U.S. PATENT DOCUMENTS

| | | | | |
|---|---|---|---|---|
| 2006/0167659 A1* | 7/2006 | Miyasaka | ............... | F16C 19/52 |
| | | | | 702/185 |
| 2014/0025205 A1* | 1/2014 | Inazumi | ................. | B25J 9/1694 |
| | | | | 700/258 |
| 2015/0160098 A1* | 6/2015 | Noda | .................... | G01M 99/00 |
| | | | | 702/35 |
| 2020/0287497 A1* | 9/2020 | Nagata | ..................... | G06N 3/08 |

FOREIGN PATENT DOCUMENTS

| | | | | |
|---|---|---|---|---|
| CN | 103558955 A | * | 2/2014 | |
| JP | 5827425 B1 | * | 12/2015 | ......... G05B 23/0232 |
| KR | 10-2013-0042523 A | | 4/2013 | |
| KR | 10-2017-0083308 A | | 7/2017 | |
| KR | 10-1866676 B1 | | 6/2018 | |
| KR | 10-2020-0086977 | | 7/2020 | |
| KR | 10-2252740 B1 | | 5/2021 | |
| KR | 10-2021-0097614 A | | 8/2021 | |

* cited by examiner

*Primary Examiner* — Suresh Suryawanshi
(74) *Attorney, Agent, or Firm* — Andrew D. Fortney; Central California IP Group, P.C.

(57) ABSTRACT

Provided are a system and a method for diagnosing a state of mechanical equipment. More particularly, provided are a system and a method for diagnosing a state of mechanical equipment, wherein a health index is calculated for various levels in the equipment using one or more sensor parameter values related to individual components of the equipment, and then a current state value of the equipment is finally derived.

19 Claims, 10 Drawing Sheets

SYSTEM AND METHOD FOR DIAGNOSING STATE OF MECHANICAL EQUIPMENT

CROSS REFERENCE TO RELATED APPLICATION

The present application claims priority to Korean Patent Application No. 10-2021-0110031, filed Aug. 20, 2021, the entire contents of which are incorporated herein for all purposes by this reference.

BACKGROUND OF THE INVENTION

Field of the Invention

The present disclosure relates to a system and a method for diagnosing a state of mechanical equipment. More particularly, the present disclosure relates to a system and a method for diagnosing a state of mechanical equipment that calculates a health index per level using one or more sensor parameter values related to each individual component, and then derives a current state value of the equipment.

Description of the Related Art

High speed and automation of industrial equipment or machining systems increase the production speed of products and productivity. Accordingly, it is beneficial to ensure the stability of equipment. As equipment facilities become more dependent on devices, damages increase, such as device breakage, and production losses resulting from shutdowns and major accidents due to faults. In order to prevent such possible problems, the benefits of quality evaluation work for equipment have been recognized. To this end, currently, various types of evaluation methods are known.

Some examples of quality evaluation methods for equipment include a "deep learning method" and a "distance-based numerical analysis method." First, regarding the deep learning method, in performing a process, differences occur in the process by equipment, by chamber, and by recipe because of the equipment environment, and it is practically impossible to learn and manage a model related to all possible cases to which those differences can be applied. In addition, when actually performing the same process, different equipment does not operate/perform processing in exactly the same way, and due to a hidden layer, it is difficult or impossible for a user to accurately interpret results, and lastly, most of the process data may not have normality.

Furthermore, the distance-based numerical analysis method has difficulties in its utilization because some data are inappropriate for time series data and it is difficult for a user to accurately interpret results.

The foregoing is intended merely to aid in the understanding of the background of the present disclosure, and is not intended to mean that the present disclosure falls within the purview of the related art that is already known to those skilled in the art.

Document of Related Art

Korean Patent Application Publication No. 10-2020-0086977, "APPARATUS AND METHOD FOR DIAGNOSING PASSIVE EQUIPMENT."

SUMMARY OF THE INVENTION

The present disclosure is to solve the problems in the related art described above.

To solve the problems in the related art, the present inventor has conceived a system and a method for diagnosing a state of mechanical equipment that derives a state value of the mechanical equipment by comparing data on a setting value and an actual measurement value for each parameter node. The system and the method will be described in detail below.

The present disclosure is directed to a system (e.g., a diagnostic system) and a method for diagnosing a state of mechanical equipment that calculates health indexes of each individual component and module (e.g., of the mechanical equipment) using a sensor parameter value related to each individual component (and, optionally, each module), and then derives a current state value of the mechanical equipment, thereby predicting the occurrence or probability of a malfunction/defect of the mechanical equipment before and/or after shipment, and in early and/or late operation stages.

In addition, the present disclosure is directed to a system and a method for diagnosing a state of mechanical equipment that compares an actual measurement value for each sensor parameter node to a setting value, which is an absolute reference and not a relative reference, to derive a health index of a parameter node (e.g., of or for the mechanical equipment or a component or module thereof), thereby improving or ensuring greater objectivity (e.g., in the health index and state value calculation/derivation results).

In addition, the present disclosure is directed to a system and a method for diagnosing a state of mechanical equipment that excludes a node in a parameter off state from the health index and/or a weighting calculation process, to reduce or prevent distortion (e.g., of the health index and state value calculation/derivation results).

In addition, the present disclosure is directed to a system and a method for diagnosing a state of mechanical equipment that proportionally divides by the number of child nodes connected to each individual parent node when setting an initial weighting for each node, thereby reducing or preventing personal bias.

In addition, the present disclosure is directed to a system and a method for diagnosing a state of mechanical equipment that updates the weighting using a variation in the health index between the current time point and a previous time point, to derive an accurate state value of the mechanical equipment over time.

In addition, the present disclosure is directed to a system and a method for diagnosing a state of mechanical equipment that raises the variation in the health index to the m-th power when calculating an adjustment value so as to effectively control discrimination of the weighting at the current time point according to a variation of each of the nodes.

The present disclosure may be implemented by one or more embodiments having one or more of the following configurations to achieve the above-described objectives.

According to an embodiment of the present disclosure, a system for diagnosing a state of mechanical equipment includes a detection part (or detector) configured to sense parameter values of individual components (e.g., of the mechanical equipment); a state value derivation part (or state value calculator) configured to calculate a state value of the mechanical equipment from the parameter values (e.g., from the detection part); a database configured to store the state value; and a controller.

According to another embodiment of the present disclosure, in the system for diagnosing the state of the mechanical equipment, the state value derivation part may include a health index derivation part (or health index derivator) configured to derive health indexes of individual parameter nodes in a parameter layer (e.g., of the diagnostic system) from the parameter values (e.g., from the detection part); a weighting derivation part (or weighting calculator) configured to provide weightings for the individual parameter nodes in the parameter layer; and a health index calculation part (or health index calculator) configured to derive or calculate the state value of the mechanical equipment by multiplying the health indexes of the individual parameter nodes by the weightings (e.g., the weighting corresponding to the same individual parameter node).

According to still another embodiment of the present disclosure, in the system for diagnosing the state of the mechanical equipment, the health index derivation part may be configured to derive or calculate each of the health indexes of the individual parameter nodes by dividing an overlapping area of a setting value and an analog value for a corresponding parameter within a set time interval and/or by a union of (e.g., combining) the setting value and the analog value.

According to still another embodiment of the present disclosure, in the system for diagnosing the state of the mechanical equipment, the health index derivation part may be configured to omit a corresponding parameter value from the calculation of the health index of the parameter node when the corresponding parameter is in an off state.

According to still another embodiment of the present disclosure, in the system for diagnosing the state of the mechanical equipment, the weighting derivation part may be configured to provide weightings for individual component nodes in a component layer (e.g., of the diagnostic system) and individual module nodes in a module layer (e.g., of the diagnostic system), and the weighting derivation part may include an initial weighting setting module configured to divide into a number of individual child nodes connected to a single parent node, and/or to assign initial weightings to the individual child nodes; and a weighting update module configured to update the weightings from a previous time point for the individual child nodes into the weightings at a current time point.

According to still another embodiment of the present disclosure, in the system for diagnosing the state of the mechanical equipment, the weighting update module may include a variation calculation module configured to calculate variations in the health indexes of the individual child nodes for each period (e.g., each time period or cycle for samples or parameter value updates from the sensors); an adjustment value calculation module configured to calculate adjustment values at the current time point using the variations in the health indexes of the individual child nodes for each period; and a weighting calculation module configured to update the weightings for the individual child nodes connected to the individual parent node.

According to still another embodiment of the present disclosure, the system for diagnosing the state of the mechanical equipment may derive each of the adjustment values by adding the weighting at the previous time point for the individual child node to a value obtained by multiplying a hyperparameter by the variation in the health index between the previous time point and the current time point raised to the m-th power.

According to still another embodiment of the present disclosure, in the system for diagnosing the state of the mechanical equipment, m may be equal to or greater than 2.

According to still another embodiment of the present disclosure, in the system for diagnosing the state of the mechanical equipment, the weighting calculation module may be configured to give a new weighting for each of the individual child nodes by dividing the adjustment value of each of the individual child nodes connected to the same parent node by a sum of the adjustment values of the individual child nodes connected to the same parent node.

According to still another embodiment of the present disclosure, in the system for diagnosing the state of the mechanical equipment, the health index calculation part may be configured to derive or calculate new health indexes by multiplying the health indexes of the individual parameter nodes at the current time point by the weightings at the current time point (e.g., resulting from updated weightings from the weighting calculation module), and then to derive or calculate the state value of the mechanical equipment using a sum of values obtained by multiplying the new health indexes by the new weightings of the individual child nodes connected to the same parent node.

According to an embodiment of the present disclosure, a method for diagnosing a state of mechanical equipment includes deriving or calculating health indexes of individual parameter nodes from sensor parameter values (e.g., time series data related to each component of the mechanical equipment); providing initial weightings for the individual parameter nodes, individual component nodes (e.g., to which the individual parameter nodes are connected), and individual module nodes; updating weightings at an immediately previous time point for the individual parameter nodes, the individual component nodes, and the individual module nodes; and deriving or calculating from the health indexes at a current time point of the individual parameter nodes, new health indexes at the current time point for the respective nodes (e.g., each of the parameter nodes, the component nodes, and/or the module nodes).

According to another embodiment of the present disclosure, in the method for diagnosing the state of the mechanical equipment, when deriving or calculating the health indexes, each of the health indexes of the individual parameter nodes may be derived or calculated from a setting value and an actual measurement value for or of respective or corresponding ones of the parameters or parameter values.

According to still another embodiment of the present disclosure, in the method for diagnosing the state of the mechanical equipment, when deriving the health indexes, each of the health indexes of the individual parameter nodes may be derived from the setting value and the actual measurement value for respective or corresponding parameters using an Intersection over Union (IoU) method.

According to still another embodiment of the present disclosure, in the method for diagnosing the state of the mechanical equipment, when providing the initial weightings, the initial weightings may be provided to child nodes by proportionally dividing into a number of the child nodes connected to an individual (e.g., the same) parent node.

According to still another embodiment of the present disclosure, in the method for diagnosing the state of the mechanical equipment, updating the weightings may include calculating a variation for individual child nodes each period (e.g., of time for a data sample or parameter value update from a corresponding sensor); and deriving or calculating new weightings of the individual child nodes from the variation (e.g., during the most recent period).

According to still another embodiment of the present disclosure, in the method for diagnosing the state of the mechanical equipment, updating the weightings may further include calculating adjustment values for the respective nodes from the corresponding variation each period.

According to still another embodiment of the present disclosure, in the method for diagnosing the state of the mechanical equipment, each of the adjustment values may be derived or calculated by adding the weighting at the immediately previous time point for each of the individual child nodes to a value obtained by multiplying a hyperparameter (e.g., for the individual child node) by the variation in the health index between the immediately previous time point and the current time point, raised to the m-th power.

According to still another embodiment of the present disclosure, in the method for diagnosing the state of the mechanical equipment, deriving the new-weightings may comprise dividing the adjustment value of each of the individual child nodes connected to a same parent node by a sum of the adjustment values of the individual child nodes connected to the same parent node.

According to still another embodiment of the present disclosure, in the method for diagnosing the state of the mechanical equipment, deriving the new health indexes may comprise multiplying the health indexes at the current time point of the individual child nodes connected to an individual parent node by the new weightings at the current time point (e.g., resulting from updating the weightings), and adding the new health indexes of the individual child nodes connected to the individual parent node to derive the new health index of the individual parent node.

According to still another embodiment of the present disclosure, the method for diagnosing the state of the mechanical equipment may further include deriving or calculating a state value of the mechanical equipment by adding the new health indexes of the individual child nodes connected to a mechanical equipment node.

According to the above configurations, the present disclosure has the following effects.

According to the present disclosure, health indexes of each individual component and module are calculated using a sensor parameter value related to each individual component, and then a current state value of the mechanical equipment is derived, thereby predicting the occurrence or probability of a malfunction/defect of the mechanical equipment before and/or after shipment, and in early and/or late operation stages.

In addition, according to the present disclosure, an actual measurement value for each parameter node is compared to a setting value, which is an absolute reference and not a relative reference, to derive a health index of a parameter node, thereby improving or ensuring greater objectivity (e.g., in the health index and state value calculation/derivation results).

In addition, according to the present disclosure, a node in a parameter off state is excluded from the health index and/or weighting calculation(s) to reduce or prevent distortion (e.g., of the health index and state value calculation/derivation results).

In addition, according to the present disclosure, setting an initial weighting for each node may comprise proportional division into the number of child nodes connected to each individual parent node, thereby reducing or preventing personal bias.

In addition, according to the present disclosure, a weighting may be updated from a variation in the health index between the current time point and the previous time point, to derive an accurate state value of the mechanical equipment over time.

In addition, according to the present disclosure, when calculating an adjustment value, the variation in the health index is raised to the m-th power to effectively control discrimination of the weighting at the current time point (e.g., according to the variation in the corresponding node [s]).

It is noted that, even though it may not be explicitly described herein, an advantageous effect and a tentative advantageous effect that are expected from technical features of the present disclosure are regarded as being described in the present specification.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, embodiments of the present disclosure will be described in detail with reference to the accompanying drawings. It is noted that embodiments of the present disclosure may be changed to a variety of embodiments. The scope of the present disclosure should not be interpreted as being limited to the embodiments described hereinbelow, but should be interpreted on the basis of the descriptions in the appended claims. In addition, the embodiments of the present disclosure are provided for reference in order to fully describe the disclosure for those skilled in the art.

Unless otherwise mentioned in context, a singular noun or a singular noun phrase may have a plural meaning throughout the present specification. The terms "comprise" and/or "comprising" that are used in the present specification are intended to indicate that a shape, a number, a step, an operation, a member, an element, a group thereof, etc., are present, and do not to preclude the presence or addition of one or more other shapes, numbers, steps, operations, members, elements, groups thereof, etc.

In the present specification, according to need and/or design criteria, individual elements may be integral with each other or independent of each other. It should be noted that no specific limitation to such arrangements is imposed.

Hereinafter, a system 1 for diagnosing a state of mechanical equipment according to one or more embodiments of the present disclosure will be described in detail with reference to the accompanying drawings. Hereinafter, for convenience of description, semiconductor manufacturing equipment, which is one type of mechanical equipment, is described for illustrative purposes, but the scope of the present disclosure is not limited to a specific type and can be applied to various fields such as battery manufacturing equipment or other manufacturing equipment.

Figure 1:
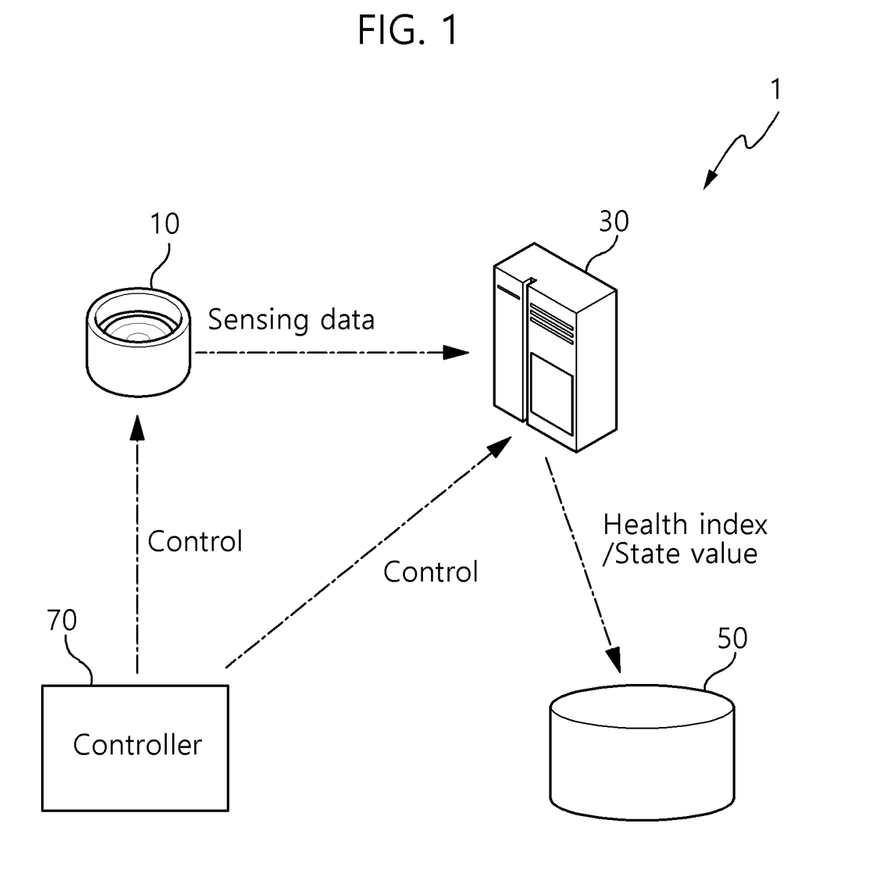
FIG. 1 is a conceptual diagram showing a system for diagnosing a state of mechanical equipment according to one or more embodiments of the present disclosure.
Figure 2:
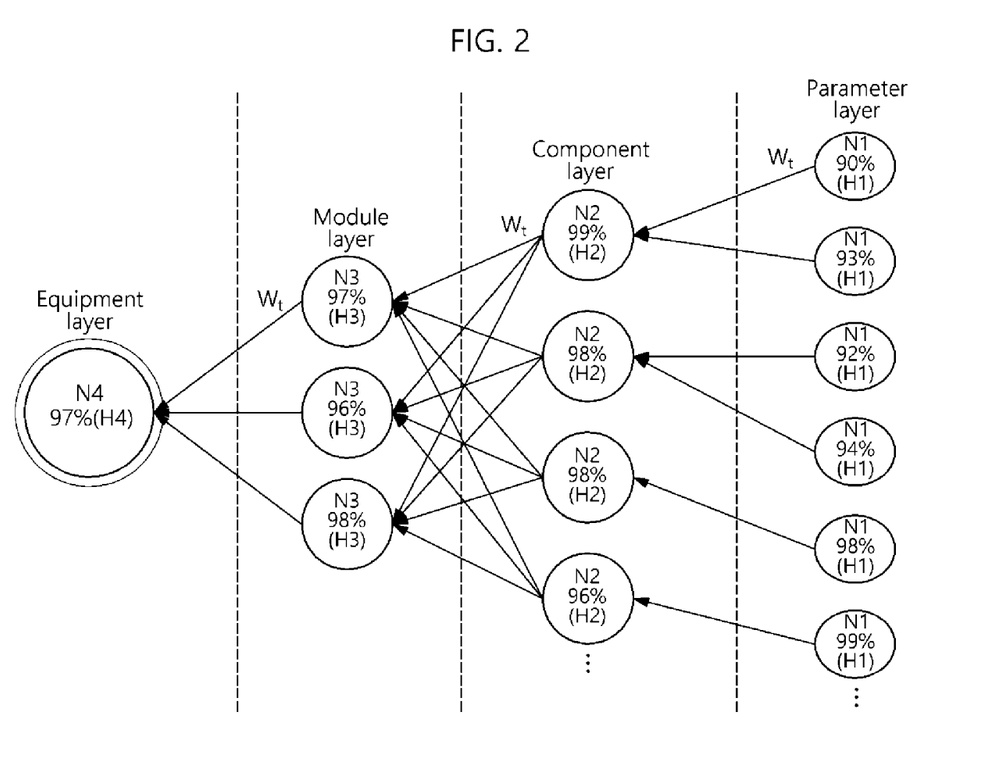
FIG. 2 is a reference diagram showing a model for diagnosing a piece of mechanical equipment, classified by layer.

FIG. 1 is a conceptual diagram showing a system for diagnosing a state of mechanical equipment according to one or more embodiments of the present disclosure. FIG. 2 is a block diagram showing an exemplary system for diagnosing a state of mechanical equipment according to FIG. 1.

Referring to FIGS. 1 and 2, the present disclosure relates to a system 1 for diagnosing a state of mechanical equipment. More particularly, the present disclosure relates to a system 1 for diagnosing a state of mechanical equipment that calculates a health index per level using one or more sensing parameter values (factors) related to each individual component (e.g., of the mechanical equipment), and then derives a current state value of the mechanical equipment. That is, the present disclosure relates to a system for back-tracking a quality/current state of equipment using one or more sensor values for one or more parameters (e.g., of one or more components of the mechanical equipment). The system will be described in detail. As will be described later, sensor parameters (i.e., parameters having a value determined by a sensor) include a setting value I, a measurement value A, and an on/off state value (e.g., for each parameter detected by an individual sensor), and the term "sensor parameter values" may mean or refer to values of the three sensor parameters above.

Furthermore, it is understood that the word "health indexes" refer to indexes for determining state values of the equipment, one or more modules thereof, components thereof, and one or more parameter layers useful for making a diagnosis of the equipment.

FIG. 2 is a reference diagram showing a model for diagnosing a piece of mechanical equipment by layer.

Hereinbelow, a component may be the minimum unit of hardware configured to perform an independent function, and may refer to a part in a group of parts that constitute an individual module. A module may be a set of components that, taken together, may work as one unit to provide a larger function. In this regard, providing a description based on semiconductor manufacturing equipment as an example, components may include a plasma source, a mass flow controller (MFC), a pressure controller (e.g., adaptive pressure control; APC), a chuck for holding a semiconductor wafer, a baffle, etc. In addition, each module includes one or more components. Furthermore, in general, semiconductor manufacturing equipment/mechanical equipment comprises one or more modules. In addition, related parameter values in general semiconductor manufacturing equipment may include a lead value of source power, a chuck temperature, a gas flow rate, for example.

Referring to FIG. 2, specific mechanical equipment may comprise one or more modules, and each individual module may include one or more components, and each individual component may be related to one or more sensor parameters. That is, a model for diagnosing individual mechanical equipment may have a total of four layers: a parameter layer, a component layer, a module layer, and an equipment layer. Each layer may include corresponding nodes. For example, the component layer may include a plasma source node, a mass flow controller node, a pressure controller node, and a chuck node. The parameter layer may include a source power lead node, a gas flow rate node, and a chuck temperature node. Hereinafter, the nodes constituting the parameter layer are referred to as "parameter nodes N1", the nodes constituting the component layer are referred to as a "component nodes N2", the nodes constituting the module layer are referred to as a "module nodes N3", and the final node(s) of the equipment layer is/are referred to as "equipment node(s) N4".

Referring to FIGS. 1 and 2, the system 1 for diagnosing a state of mechanical equipment according to an embodiment of the present disclosure may include a detection part (or detector) 10, a state value derivation part (or stat value calculator) 30, a database 50, and a controller 70.

The detection part 10 comprises a sensor configured to detect or sense data related to each component, and may comprise a temperature sensor, a pressure sensor, a gas or chemical sensor, and/or an optical sensor, depending on or according to the function of a corresponding component, but is not limited thereto. The sensing data detected by the detection part 10 comprises time series data, and may be a parameter value such as a measurement value A, which will be described later. Furthermore, the sensing data related to each individual component detected by the detection part 10 is transmitted to the state value derivation part 30.

Figure 4:
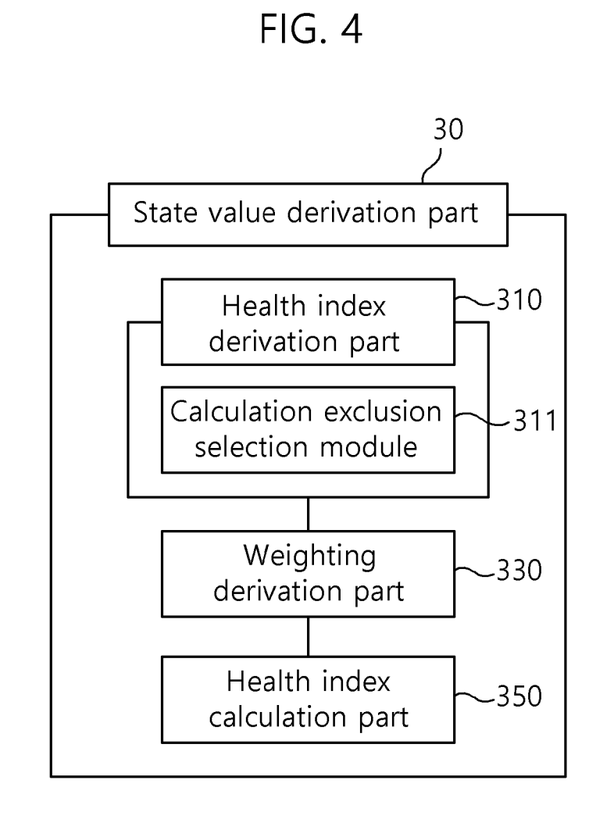
FIG. 4 is a block diagram showing an exemplary state value derivation part according to FIG. 1.

FIG. 4 is a block diagram showing the state value derivation part 30 according to FIG. 1.

Figure 3:
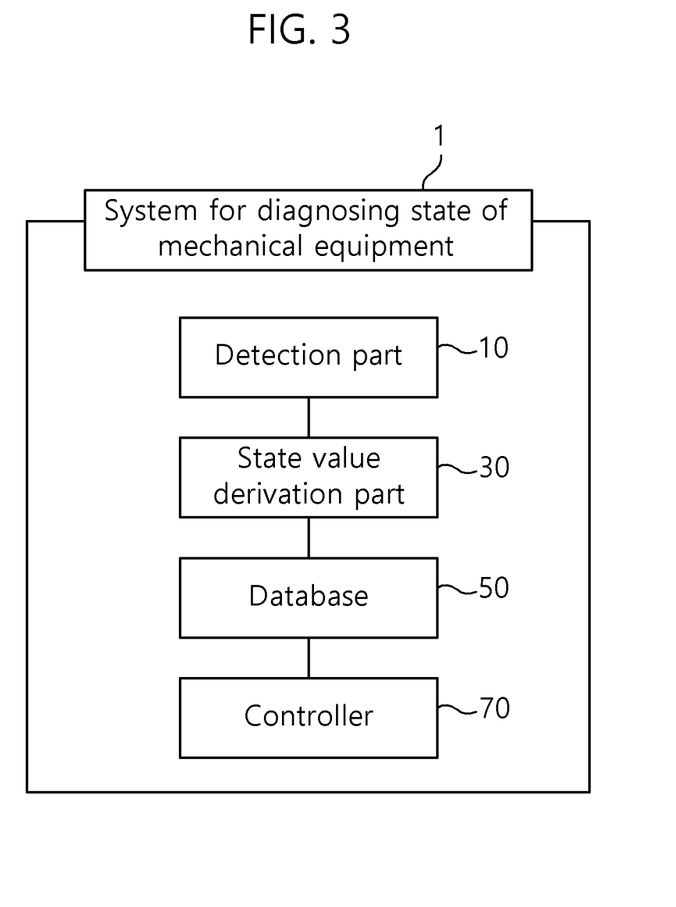
FIG. 3 is a block diagram showing an exemplary system for diagnosing a state of mechanical equipment according to FIG. 1.

Referring to FIGS. 3 and 4, the state value derivation part 30 is configured to calculate a state value of mechanical equipment from the sensing data received from the detection part 10. To this end, the state value derivation part 30 may include a health index derivation part (or health index derivator) 310, a weighting derivation part (or weighting derivator) 330, and a health index calculation (or health index calculator) part 350.

FIGS. 5A to 5D are reference graphs showing how the health index derivation part 310 according to FIG. 4 operates.

Referring to FIGS. 4 and 5A to 5D, the health index derivation part 310 is configured to derive and/or calculate, from the sensing data received from the detection part 10 (e.g., each piece of the sensing data), a health index of each individual parameter node N1 in the parameter layer. Hereinafter, a health index of a parameter node N1 is referred to as a "first health index H1". In addition, a health index of a component node N2 is referred to as a "second health index H2", a health index of a module node N3 is referred to as a "third health index H3", and a health index of an equipment node N4 is referred to as a "state value H4". Furthermore, when collectively described below, a "health index" is understood to mean any one of the first to third health indexes H1 to H3 (e.g., of a related node). Furthermore, the health indexes and the state value are derived from time series data, and thus are understood as variable values over time.

The health index derivation part 310 calculates a first health index H1 for each parameter node N1 from a setting value I and a measurement value A for each such parameter node N1 connected to each individual component node N2, wherein the measurement value A is actually sensed by the detection part 10. The setting value I is understood to mean a command value of the controller 70 for each parameter. Furthermore, as described above, the measurement value A and the setting value I for each parameter node N1 are understood to be included in the parameter values.

Figure 5A:
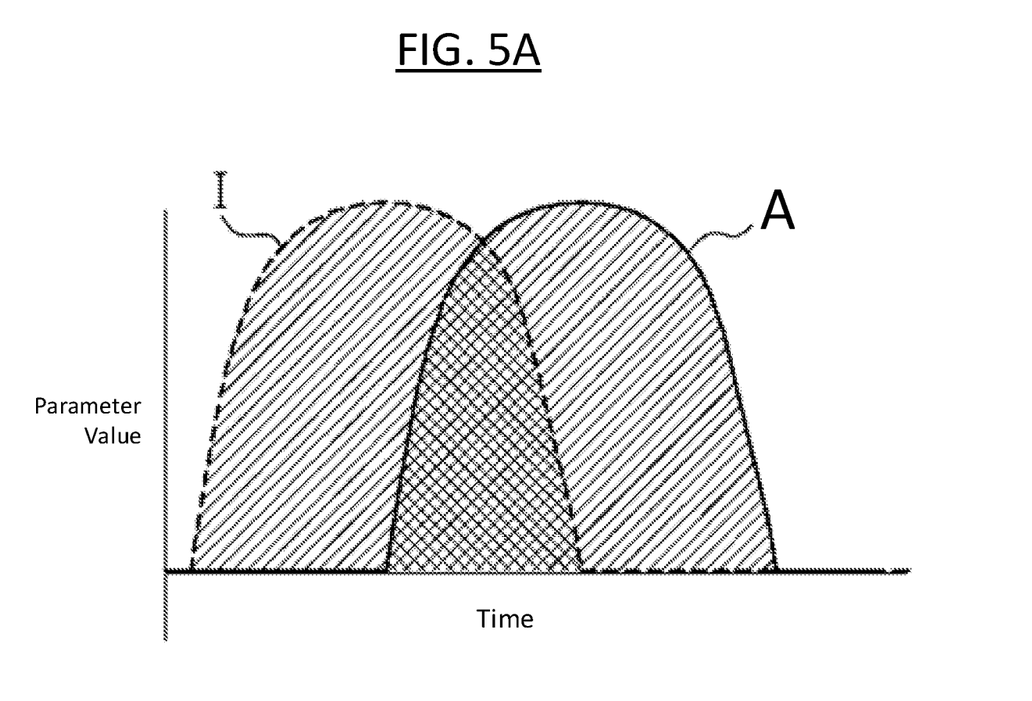
FIGS. 5A to 5D are reference graphs showing how the health index derivation part according to FIG. 4 operates.
Figure 5B:
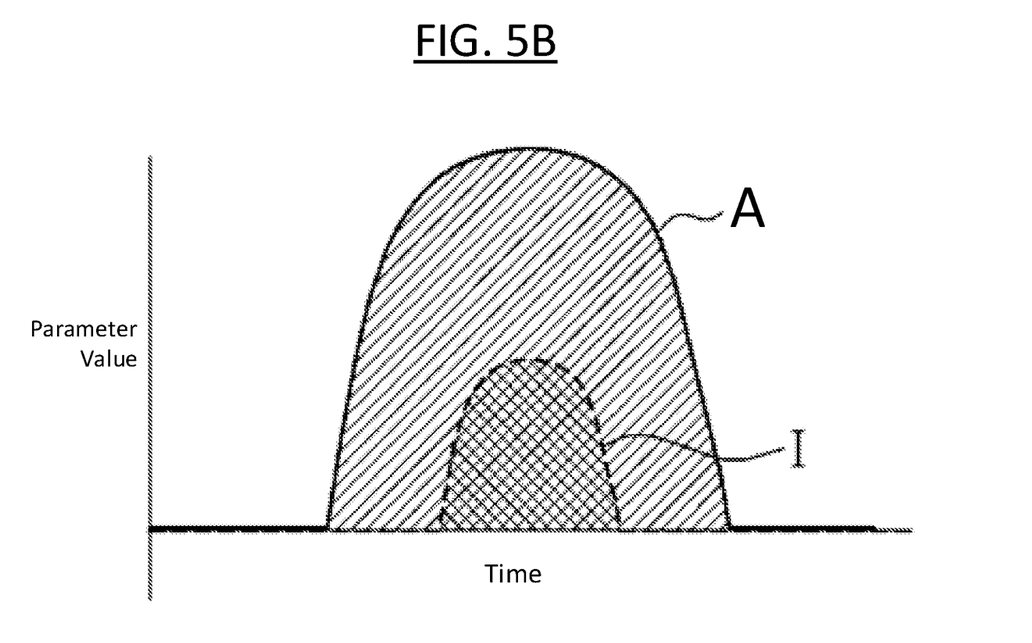
Figure 5C:
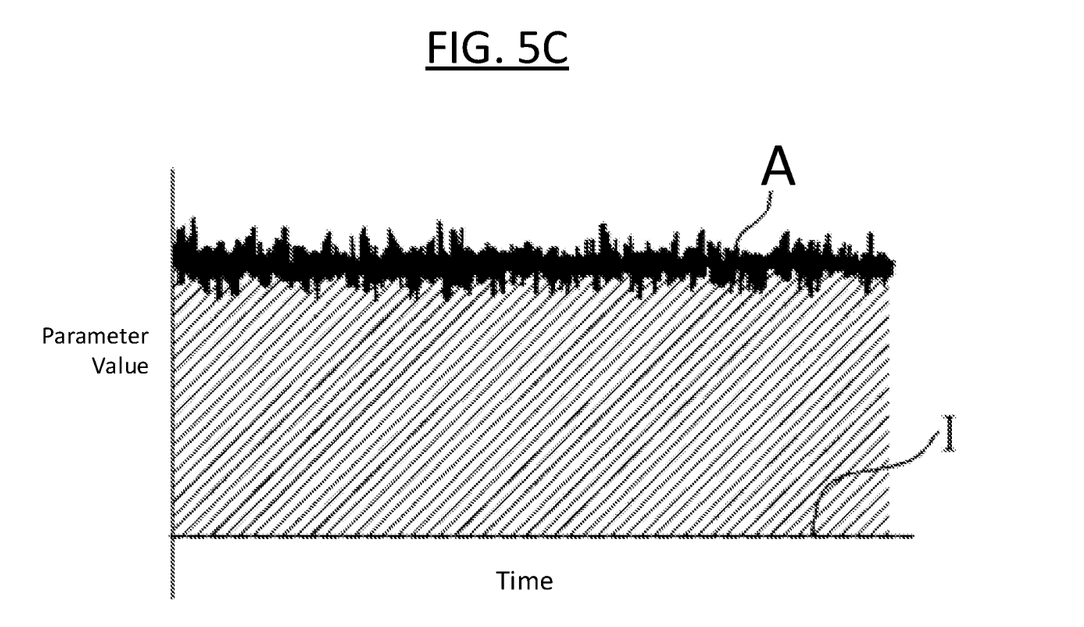
Figure 5D:
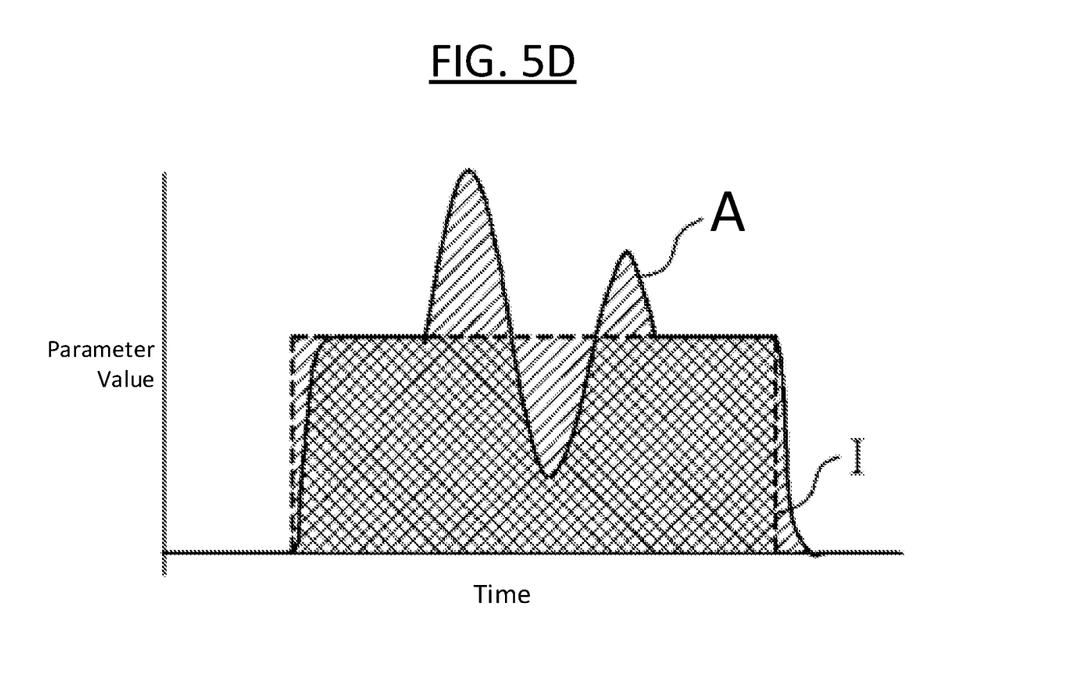

The measurement value A for each parameter node N1 in each individual component may show a slightly different value or pattern from the setting value I (that is, a command value/control value) with the passage of operation time. For example, referring to FIG. 5A, a phase shift may occur at the actual measurement value A compared to the setting value I. FIG. 5B shows a vertical shift in the actual measurement value A compared to the setting value I. Referring to FIG. 5C, when the setting value I is 0 (or another fixed value) and is constant, the actual measurement value A may have a specific value other than 0 (e.g., it may drift or be offset from 0 or the other fixed value). Alternatively, referring to FIG. 5D, a ripple, or one or more spikes, may occur in the actual measurement value A.

Herein, the health index derivation part 310 derives, from an Intersection over Union (IoU), a first health index H1 of each individual parameter node N1 by using the setting value I and the measurement value A for each parameter node N1 (see FIG. 2). Specifically, for example, an overlapping area (intersection) of a setting value I and a measurement value A at a preset time (or one operation time) resulting from driving or operating a component of the equipment is divided by a union of the setting value I and the measurement value A, thereby deriving a first health index H1. In the graphs shown in FIGS. 5A to 5D, the X-axis denotes time or period, and the Y-axis denotes the value of a parameter being measured. For example, the Y-axis denotes the unit of ° C. or K when the parameter is a temperature.

The first health index H1 may have any value that is equal to or greater than 0 and equal to or less than 1. When the aforementioned phase shift, vertical shift, and/or ripple/spike occur, the first health index may have a value between 0 and 1. Furthermore, when a component operates despite a non-operation command, the first health index may have a value of 0.

Each individual parameter node N1 may have a reference value. In this case, when the first health index H1 of each parameter node N1 is equal to or less than or the reference value, a worker (or equipment user) is notified that there may be a problem in performing the process (e.g., that the equipment performs during operation). For example, when the first health index H1 of each parameter node N1 is equal to or less than the reference value, an alarm such as a warning sound may be given. However, no limitation thereto is imposed. Furthermore, the first health index H1 for each period (e.g., of time) of each parameter node N1 may be classified by time and stored in the database 50 so that a worker or user can search the database.

As described above, the health index derivation part 310 derives a first health index H1 for each parameter node N1. Furthermore, the health index derivation part 310 may include a calculation exclusion selection module 311.

The calculation exclusion selection module 311 is a module for excluding an element (e.g., a parameter or an individual parameter node N1) when the component corresponding to the element is in an off state. For example, when a Gas1 valve and a Gas2 valve are closed during a specific period (e.g., of operation of the equipment including the Gas1 and Gas2 valves), the setting value I of the Gas1 valve and the setting value I of the Gas2 valve are 0, and the first health indexes H1 of the corresponding parameter nodes N1 are 0. Herein, when considering (e.g., calculating or determining) a weighting w and the second and third health indexes H2 and H3 (which will be described later), first health indexes H1 of the parameter nodes N1 having a 0 value (e.g., corresponding to the Gas1 valve and the Gas2 valve) may result in distortion of the weighting w and/or the health indexes H2 and/or H3. Therefore, the calculation exclusion selection module 311 omits the calculation of a first health index H1 of a parameter value corresponding to an element and/or component in a non-operating state. Afterward, when the element and/or component are operating (e.g., the Gas1 valve and/or the Gas2 valve is/are opened), the first health index H1 of the corresponding parameter node N1 may be considered.

Figure 6:
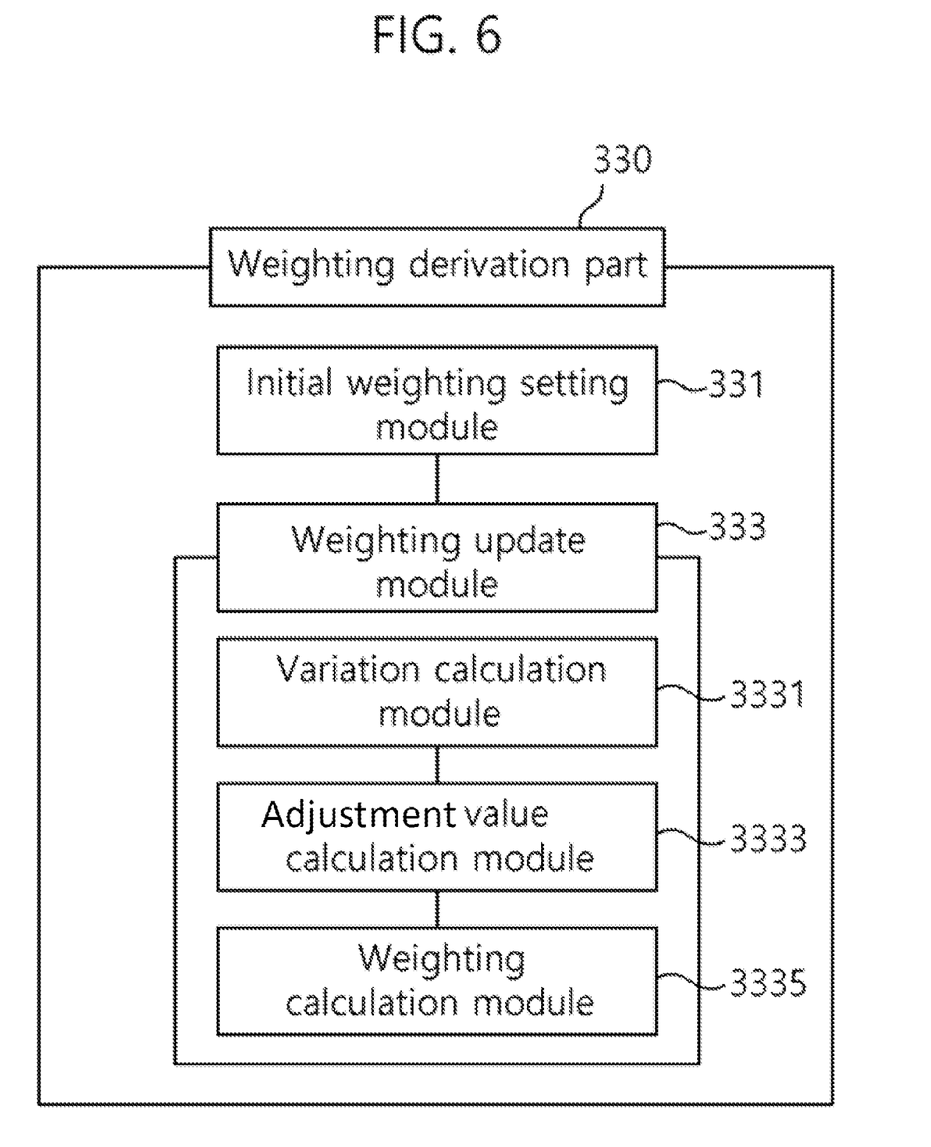
FIG. 6 is a block diagram showing an exemplary weighting derivation part according to FIG. 4.

FIG. 6 is a block diagram showing the weighting derivation part 330 according to FIG. 4.

Referring to FIGS. 4 and 6, the weighting derivation part 330 is configured to give a weighting w to individual nodes N1, N2, and N3 in the parameter layer, component layer, and module layer, respectively. Individual nodes in a single layer may have the same or different relative importance, and in order to apply this, weightings need to be considered and/or applied (e.g., to the nodes). However, it is difficult to give objectivity to the weightings because of issues such as the absence of a dependent variable, and intervention of personal bias. To solve this problem, the weighting derivation part 330 according to the present disclosure adopts a method of giving a greater weighting w to a node N1, N2, or N3 showing a relatively large variation during one or more unit periods of time (e.g., each hour), rather than a weighting for the relative importance of the nodes N1, N2, and N3. The details will be described later.

To this end, the weighting derivation part 330 may include an initial weighting setting module 331, and a weighting update module 333.

Figure 7:
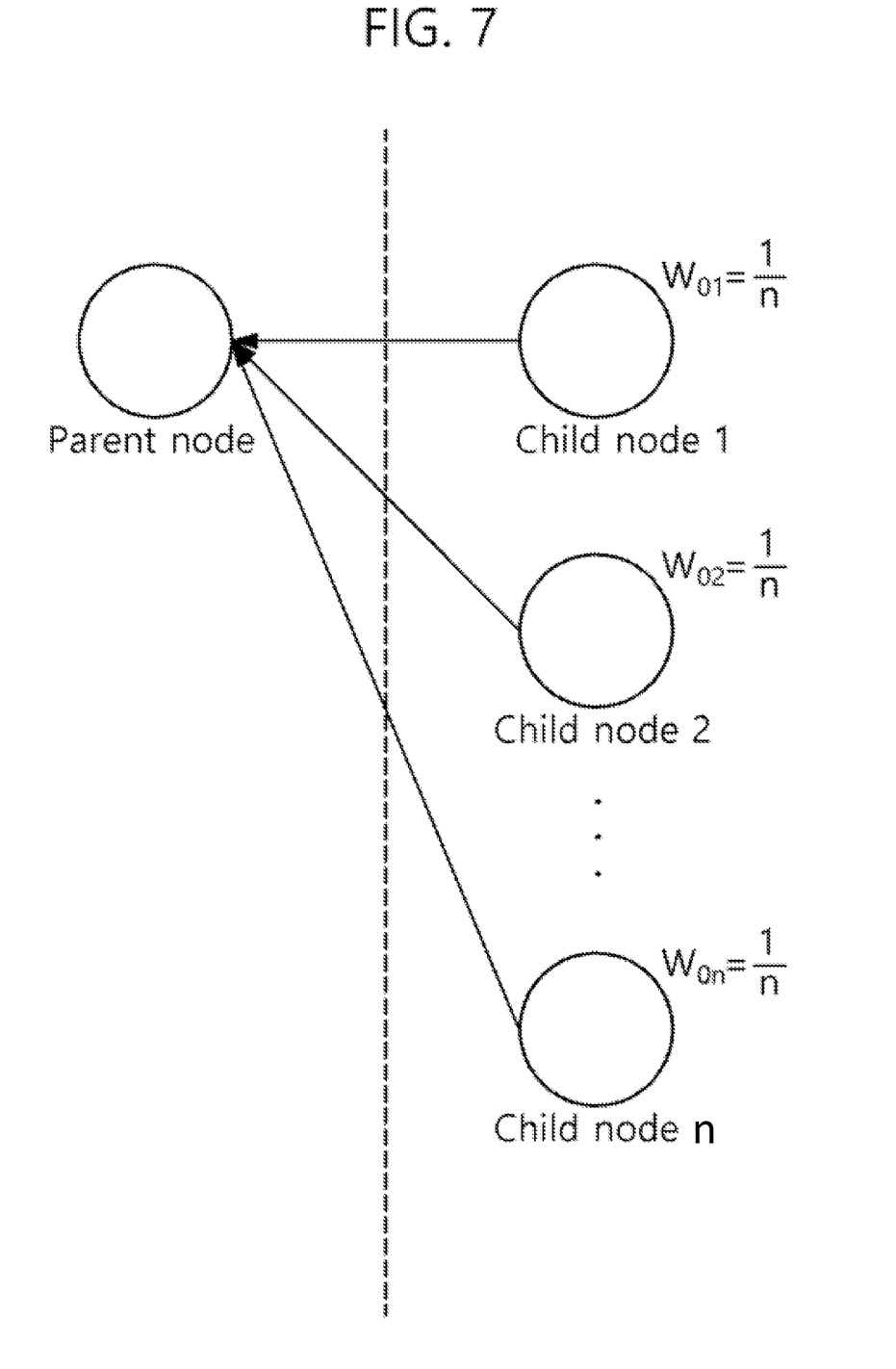
FIG. 7 is a reference diagram showing an exemplary initial weighting setting module according to FIG. 6.

FIG. 7 is a reference diagram showing the initial weighting setting module 331 according to FIG. 6.

Referring to FIGS. 6 and 7, the initial weighting setting module 331 is a module for setting an initial weighting $w_0$ by proportionally dividing a unity weighting (i.e., a weighting of 1 for a parent node) into the number of child nodes connected to a corresponding parent node. For example, when three parameter nodes N1 are connected to one component node N2, each of the parameter nodes N1 is given an initial weighting $w_o$ of ⅓. More specifically, when parameter nodes N1 corresponding to a Gas1 flow rate value and a Gas2 flow rate value are connected to a mass flow controller (MFC)-related component node N2 in semiconductor manufacturing equipment, each of the parameter nodes N1 are given an initial weighting $w_0$ of 0.5. Herein, the description that a parent node and a child node are "connected" to each other means that the parent node and the child node are directly connected, and does not mean the concept of indirect connection. That is, one component node N2 may be a parent node connected to a related parameter node N1, and one module node N3 may be a parent node connected to a related component node N2. However, one module node N3 cannot be a parent node connected to a specific parameter node N1.

As described above, the initial weighting setting module 331 sets an initial weighting $w_0$ for each node considering (e.g., depending on) the number of child nodes connected to a corresponding parent node, thereby preventing intervention of potentially subjective personal bias.

Referring to FIG. 6, the weighting update module 333 is configured to update a weighting $w_{t-1}$ at a previous time point into a weighting $w_t$ at the current time point (e.g., a measurement time point), for each child node over time. Specifically, the weighting update module 333 updates the immediately previous weighting $w_{t-1}$ into the weighting $w_t$ at the current time point from a variation d in the health index (e.g., first to third health indexes) for each period (e.g., of time) or between the current time point and the previous time point for a child node connected to a parent node.

To this end, the weighting update module 333 may include a variation calculation module 3331, an adjustment value calculation module 3333, and a weighting calculation module 3335.

The variation calculation module 3331 calculates a variation d for each period (e.g., of time) for the health index of each individual child node. For example, in the parameter layer, when input values of the first health index H1 of a specific parameter node N1 are 0.70 at the time point $t_1$, 0.71 at the time point $t_2$, and 0.73 at the time point $t_3$, the variation d between the time points $t_1$ and $t_2$ is 0.01. The variation calculation module 3331 calculates the health index variation d for all of the nodes in each layer.

The adjustment value calculation module 3333 is configured to calculate an adjustment value S at the current time point t from the variation d for each period (e.g., of time) for the health index of each of the individual child nodes. The adjustment value S is a value for adjustment of the weighting, so that the sum of the weightings of a set of child nodes connected to a single parent node is 1. The adjustment value S of each individual node at the current time point t may be calculated by the following Equation (1):

$$S = w_{t-1} + \lambda * |d|^m \quad (1)$$

That is, the adjustment value S of a specific node may be derived or calculated by adding the weighting $w_{t-1}$ of the node at the previous time point to a value obtained by multiplying a hyperparameter λ by the health index variation d between the previous time point t−1 and the current time point t raised to the m-th power. Herein, when the hyperparameter λ value is 0, the adjustment value S may have the same value as the weighting $w_{t-1}$ at the previous time point. When λ>0, however, the adjustment value S may change (e.g., be greater than the weighting $w_{t-1}$ at the previous time point) because the new weighting $w_t$ will have a different value as a result of an update (e.g., to the weighting and/or due to the variation). For example, the hyperparameter λ may have value of 0 when the variation d is within an acceptable or predetermined variation limit or margin (e.g., when the gas valve is set at a flow rate of 50 sccm, the acceptable or predetermined variation limit may be ±2.5 sccm, ±5 sccm, etc.). However, the hyperparameter λ may have value>0 when the variation d is outside of the acceptable or predetermined variation limit or margin. Alternatively, the hyperparameter λ may have value of 0 when the failure rate of the corresponding component (e.g., in other pieces of the same equipment) is 0, or is less than all of the other components (e.g., corresponding to the child nodes of a particular parent node). However, the hyperparameter λ may have value>0 when the failure rate of the corresponding component>0, or is not the smallest among all of the components (e.g., corresponding to the child nodes of a particular parent node). In addition, the variation d may improve the discrimination of the weighting $w_t$ at the current time point by adjusting the value of the exponent m. For example, preferably, the value of the exponent m is equal to or greater than 2.

The weighting calculation module 3335 is configured to update the weighting $w_{t-1}$ at the previous time point for each child node into a weighting $w_t$ at the current time point. For example, the weighting $w_t$ at the current time point may be derived or calculated by dividing the adjustment value S for each individual child node connected to the same parent node by the sum of the adjustment values S of all of the child nodes connected to the same parent node.

The weighting calculation module 3335 may continuously update the initial weighting $w_0$ (set by proportionally dividing 1 by the number of child nodes connected to the same parent node) periodically over time. Continuing the description of the above example, the variation d of a first health index H1 between the time point to and the time point $t_1$ corrects the weighting $w_0$ at the time point to. Furthermore, the health index variation d at the current time point t corrects the weighting $w_{t-1}$ at the previous time point (e.g., one time period earlier, t−1). In this way, continuous updates into a new weighting w are provided. Herein, the new weighting w resulting from each update depends on the health index variation d, rather than a value based on a user setting (e.g., a user-defined value), thereby reducing or eliminating individual user subjectivity, increasing or ensuring greater objectivity, and providing more accurate values over time.

Referring to FIG. 4, the health index calculation part 350 derives or calculates a new health index for each individual node at the current time point t. Specifically, the health index calculation part 350 derives or calculates a new health index by multiplying the health index at the current time point t of each individual parameter node N1 by the weighting $w_t$ at the current time point t resulting from the update as described above, and then adds the new health indexes of the child nodes connected to the same parent node, thereby deriving or calculating a new health index for the parent node.

That is, a new first health index H1 of each parameter node N1 in the parameter layer is derived or calculated, and from the new first health index H1, a new second health index H2 of each component node N2 in the component layer is derived or calculated. Afterward, the new second health index H2 is used to derive or calculate a third health index H3 of each module node N3 in the module layer, and then a current state value H4 of the mechanical equipment connected to each module node may be derived or calculated.

Referring to FIG. 3, the database 50 is configured to store therein the health index of each node for each period (e.g., after the end of each sampling time period) and a weighting w calculated/derived by the state value derivation part 30.

The controller 70 is configured to control the system 1 according to the present disclosure, but no limitation thereto is imposed.

Figure 8:
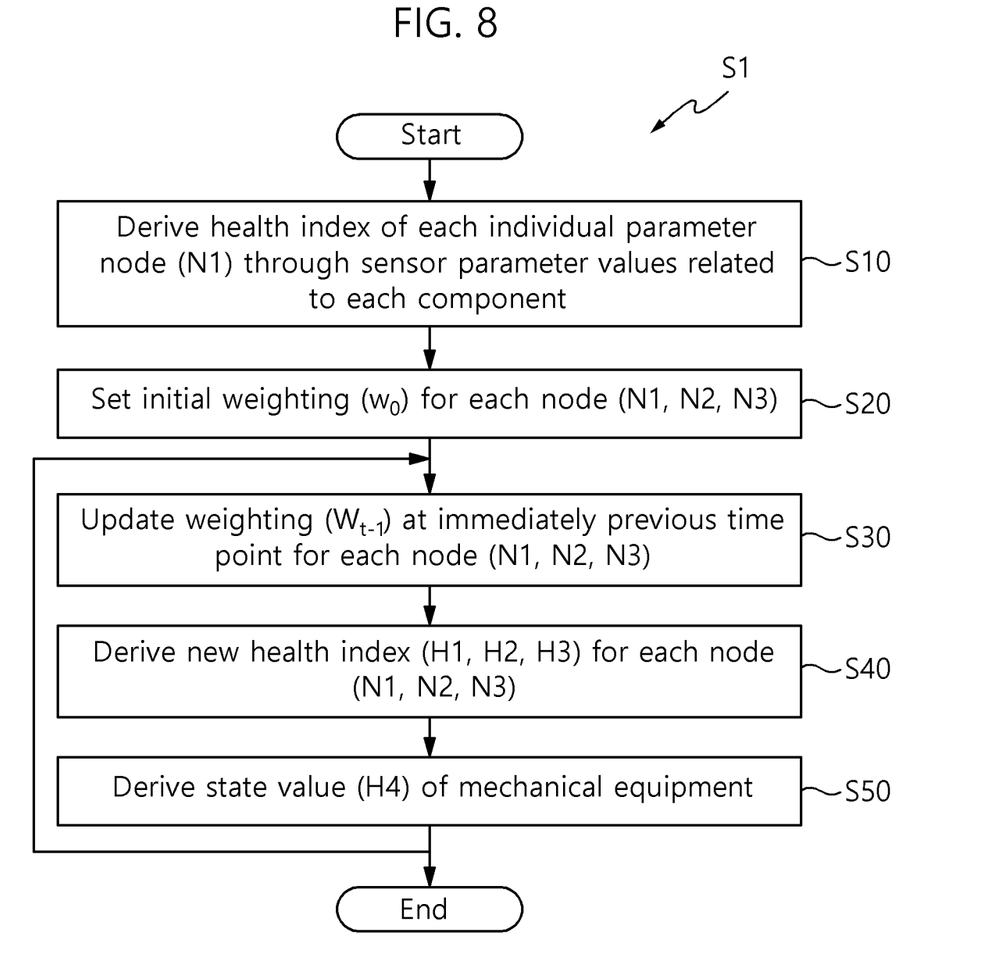
FIG. 8 is a flowchart showing a method for diagnosing a state of mechanical equipment according to one or more embodiments of the present disclosure.

FIG. 8 is a flowchart showing an exemplary method S1 for diagnosing a state of mechanical equipment according to the present disclosure.

Hereinafter, the method S1 for diagnosing a state of mechanical equipment according to the present disclosure will be described in detail with reference to the accompanying drawings. The diagnosing method S1 may be implemented by the above-described diagnosing system 1, and a detailed description of each individual element of the system 1 will be omitted. In addition, it is noted that individual steps may be performed in a temporal order different from the described order, or may be performed substantially simultaneously.

First, referring to FIG. 8, a first health index H1 of each individual parameter node N1 is derived or calculated from one or more parameter values related to each component in step S10. The parameter value(s) from which the first health index H1 is derived or calculated may be provided by one or more sensors configured to determine the parameter value(s). In step S10, the first health index H1 for each parameter node N1 may be derived by an IoU operation using a setting value I and a measurement value A for the corresponding parameter(s), and this step may be performed by the health index derivation part 310.

Afterward, an initial weighting $w_0$ for each individual parameter node N1, each individual component node N2, and each individual module node N3 are set in step S20. Step S20 may be performed by the initial weighting setting module 331. Specifically, an initial weighting $w_0$ may be set by proportionally dividing the number 1 into the number of child nodes connected to a single parent node. For example, when five child nodes are connected to a specific parent node, each of the child nodes is given the initial weighting $w_0$ of 0.2.

After step S20 is performed, a weighting $w_{t-1}$ at a previous time point (e.g., at the end of the immediately previous time period or cycle) is updated to a weighting $w_t$ at the current time point in step S30. Step S30 may be performed using the weighting update module 333. From this, an initial weighting $w_0$ may be updated to a weighting $w_1$ at a following time point (e.g., at the end of the current time period or cycle).

Figure 9:
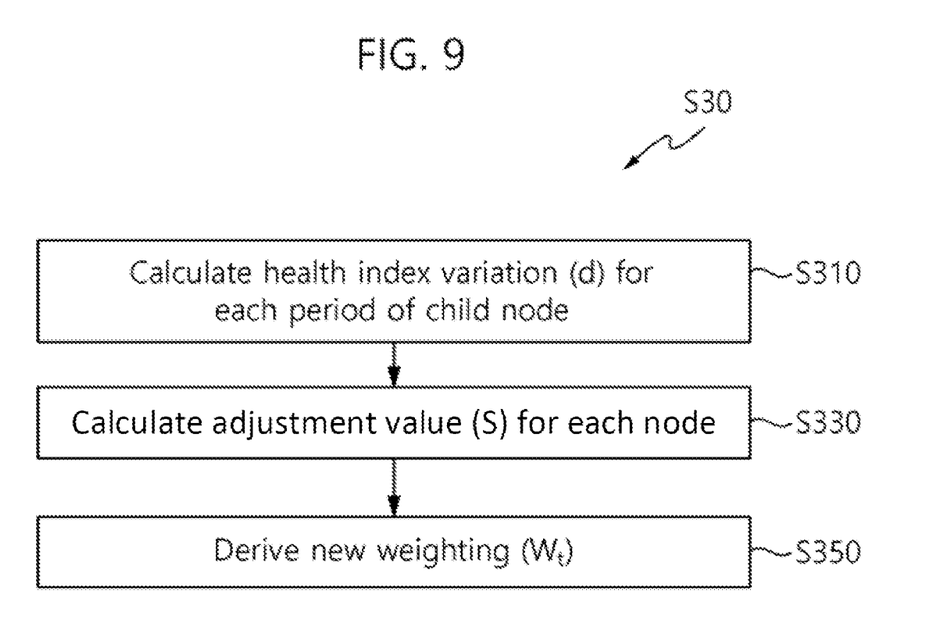
FIG. 9 is a flowchart showing an exemplary process for updating weightings according to FIG. 8.

FIG. 9 is a flowchart showing the weighting update step S30 according to FIG. 8.

With reference to FIG. 9, step S30 will be described in detail. A variation d for each period (e.g., time period and/or parameter sample period) for the health index of each individual child node is calculated in step S310. For example, a variation d between a health index at the immediately previous time point t−1 and a health index at the current time point t for each child node in the equipment is calculated. Step S310 may be performed by the variation calculation module 3331.

Afterward, an adjustment value S for each individual node is calculated in step S330. In step S330, the adjustment value S may be derived or calculated by adding a weighting $w_{t-1}$ at the previous time point for each node to a value obtained by multiplying a hyperparameter λ by the health index variation d between the previous time point t−1 and the current time point t raised to the m-th power. For details, see Equation (1) above. Step S330 may be performed by the adjustment value calculation module 3333. The adjustment value S is calculated periodically.

Next, a new weighting $w_t$ is derived or calculated in step S350. Specifically describing step S350, a weighting $w_t$ at the current time point may be derived or calculated by dividing the adjustment value S of each individual child node connected to the same parent node, by the sum of the adjustment values S of all of the individual child nodes connected to the same parent node.

Referring back to FIG. 8, after step S30 is performed, new health indexes H1, H2 and H3 are derived or calculated at the current time point t for each parameter node N1 in step S40. New health indexes H2 and H3 of parent nodes are derived or calculated from the first health index H1 at the current time point t of the individual parameter nodes N1 in step S40. For example, a first health index H1 at the current time point t of each individual parameter node N1 is multiplied by the weighting $w_t$ at the current time point t for each parameter node N1, to derive or determine a new first health index H1, and then the new health indexes of the child nodes connected to the same parent node are added to derive a new health index for the parent node. Step S40 may be performed by the health index calculation part 350.

After step S40, a state value of the mechanical equipment/mechanical equipment node based on the new health indexes H1, H2 and H3 of the individual nodes N1, N2, and N3 is derived or calculated in step S50. The state value in step S50 may also be derived or calculated in the same way as the new health indexes. For example, the state value H4 of the mechanical equipment may be derived or calculated by adding the individual new health indexes of the module nodes N3 connected to the mechanical equipment node N4.

When step S50 is finished, the process may be terminated (e.g., according to a user setting), or may proceed back to step S30 to update the weightings w.

The foregoing detailed description illustrates the present disclosure. In addition, the foregoing illustrates and describes one or more embodiments of the present disclosure. The present disclosure may be utilized in various other combinations, modifications and environments. That is, it is possible to make changes or modifications within the scope of the concept of the disclosure herein, within the scope of equivalents to the above described disclosure, and/or within the scope of the skill or knowledge of the art. The above-described embodiments are intended to describe one or more modes for carrying out the technical spirit of the present disclosure, and various modifications that may be advantageous for specific applications and/or uses of the present disclosure are possible. Accordingly, the foregoing detailed description is not intended to limit the present disclosure to the embodiment(s) disclosed.

What is claimed is:

1. A system for diagnosing a state of mechanical equipment, the system comprising:
a detection part configured to sense parameter values of individual components;
a state value derivation part configured to calculate a state value of the mechanical equipment in a time series manner from the parameter values;
a database configured to store the state value; and
a controller,
wherein the state value derivation part comprises:
a health index derivation part configured to derive health indexes of individual parameter nodes in a parameter layer from the parameter values;
a weighting derivation part configured to provide weightings for the individual parameter nodes in the parameter layer; and
a health index calculation part configured to derive or calculate the state value of the mechanical equipment by multiplying the health indexes of the individual parameter nodes by the weightings.

2. The system of claim 1, wherein the health index derivation part is configured to derive or calculate each of the health indexes of the individual parameter nodes by dividing an overlapping area of a setting value and an analog value for a corresponding parameter within a set time interval and/or by a union of the setting value and the analog value.

3. The system of claim 2, wherein the health index derivation part is configured to omit a corresponding parameter value from the calculation of the health index of the parameter node when the corresponding parameter is in an off state.

4. The system of claim 1, wherein the weighting derivation part is configured to provide weightings for individual component nodes in a component layer and individual module nodes in a module layer, and
the weighting derivation part comprises:
an initial weighting setting module configured to divide into a number of individual child nodes connected to an individual parent node, and/or assign initial weightings to the individual child nodes; and
a weighting update module configured to update the weightings from a previous time point for the individual child nodes into the weightings at a current time point.

5. The system of claim 4, wherein the weighting update module comprises:
- a variation calculation module configured to calculate variations in the health indexes of the individual child nodes for each period;
- an adjustment value calculation module configured to calculate adjustment values at the current time point using the variations in the health indexes of the individual child nodes; and
- a weighting calculation module configured to update the weightings for the individual child nodes connected to the individual parent node.

6. The system of claim 5, wherein each of the adjustment values is derived or calculated by adding the weighting at the previous time point for the individual child node to a value obtained by multiplying a hyperparameter by the variation in the health index between the previous time point and the current time point raised to the m-th power.

7. The system of claim 6, wherein the m is equal to or greater than 2.

8. The system of claim 5, wherein the weighting calculation module is configured to give a new weighting for each of the individual child nodes by dividing the adjustment value of each of the individual child nodes connected to the same parent node by a sum of the adjustment values of the individual child nodes connected to the same parent node.

9. The system of claim 8, wherein the health index calculation part is configured to derive or calculate new health indexes by multiplying the health indexes at the current time point of the individual parameter nodes by the weightings at the current time point resulting from update, and then to derive or calculate the state value of the mechanical equipment using a sum of values obtained by multiplying the new health indexes by the new weightings of the individual child nodes connected to the same parent node.

10. A method for diagnosing a state of mechanical equipment, the method comprising:
- deriving or calculating health indexes of individual parameter nodes from sensor parameter values;
- providing initial weightings for the individual parameter nodes, individual component nodes, and individual module nodes;
- updating the weightings for the individual parameter nodes, the individual component nodes, and the individual module nodes from an immediately previous time point; and
- deriving or calculating from the health indexes at a current time point of the individual parameter nodes connected to the individual component nodes, new health indexes at the current time point for the respective nodes.

11. The method of claim 10, wherein each of the health indexes of the individual parameter nodes is derived or calculated from a setting value and an actual measurement value for or of corresponding one(s) of the parameter values.

12. The method of claim 11, wherein in the deriving of the health indexes, each of the health indexes of the individual parameter nodes is derived from the setting value and the actual measurement value for or of the corresponding ones of the parameter values using an Intersection over Union (IoU) method.

13. The method of claim 10, wherein the initial weightings are provided to child nodes by proportionally dividing into a number of the child nodes connected to an individual parent node.

14. The method of claim 10, wherein updating the weightings comprises:
- calculating a variation for individual child nodes each period; and
- deriving or calculating new weightings of the individual child nodes from the variation.

15. The method of claim 14, wherein the updating of the weightings further comprises calculating adjustment values for the respective nodes from the corresponding variation each period.

16. The method of claim 15, wherein each of the adjustment values is derived or calculated by adding the weighting at the immediately previous time point for each of the individual child nodes to a value obtained by multiplying a hyperparameter by the variation in the health index between the immediately previous time point and the current time point raised to the m-th power.

17. The method of claim 15, wherein deriving the new weightings comprises dividing the adjustment value of each of the individual child nodes connected to a same parent node by a sum of the adjustment values of the individual child nodes connected to the same parent node.

18. The method of claim 16, wherein deriving the new health indexes comprises multiplying the health indexes at the current time point of the individual child nodes connected to an individual parent node by the new weightings at the current time point, and adding the new health indexes of the individual child nodes connected to the individual parent node to derive the new health index of the individual parent node.

19. The method of claim 16, further comprising deriving or calculating a state value of the mechanical equipment by adding the new health indexes of the individual child nodes connected to a mechanical equipment node.

* * * * *